US008230440B2

(12) United States Patent  
Genden et al.

(10) Patent No.: US 8,230,440 B2
(45) Date of Patent: Jul. 24, 2012

(54) SYSTEM AND METHOD TO DISTRIBUTE ACCUMULATED PROCESSOR UTILIZATION CHARGES AMONG MULTIPLE THREADS

(75) Inventors: Michael Joseph Genden, Austin, TX (US); Rolf Bernhard Hilgendorf, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 659 days.

(21) Appl. No.: 12/399,087

(22) Filed: Mar. 6, 2009

(65) Prior Publication Data

US 2010/0229176 A1 Sep. 9, 2010

(51) Int. Cl.
G06F 9/50 (2006.01)
G06F 9/46 (2006.01)
(52) U.S. Cl. ........................................ 718/104; 702/182
(58) Field of Classification Search .................... 718/104
See application file for complete search history.

(56) References Cited

U.S. PATENT DOCUMENTS

| 5,995,997 | A | 11/1999 | Horvitz | 718/102 |
|---|---|---|---|---|
| 7,089,340 | B2* | 8/2006 | Penkovski et al. | 710/200 |
| 7,137,115 | B2 | 11/2006 | Sakamoto et al. | 718/102 |
| 7,140,022 | B2 | 11/2006 | Binns | 718/105 |
| 7,389,506 | B1* | 6/2008 | Miller et al. | 718/1 |
| 7,555,753 | B2* | 6/2009 | Olszewski et al. | 718/100 |
| 7,702,779 | B1* | 4/2010 | Gupta et al. | 709/224 |
| 2003/0115118 | A1* | 6/2003 | Reinemann | 705/30 |
| 2004/0216113 | A1* | 10/2004 | Armstrong et al. | 718/104 |
| 2004/0221038 | A1* | 11/2004 | Clarke et al. | 709/226 |
| 2005/0010572 | A1* | 1/2005 | Clark et al. | 707/10 |
| 2005/0198635 | A1 | 9/2005 | Olszewski et al. | 718/100 |
| 2006/0143350 | A1* | 6/2006 | Miloushev et al. | 710/242 |
| 2006/0173665 | A1* | 8/2006 | Arndt et al. | 703/14 |
| 2008/0104610 | A1* | 5/2008 | Norton et al. | 718/108 |
| 2008/0256537 | A1* | 10/2008 | Fachan et al. | 718/1 |
| 2008/0256545 | A1 | 10/2008 | Akidau et al. | 718/104 |

OTHER PUBLICATIONS

Mercer et al., Processor Capacity Reserves: An abstraction for managing processor usage, 1993, IEEE, pp. 129-134.*
Cieslewicz, J. et al., "Realizing Parallelism in Database Operations: Insights from a Massively Multithreaded Architecture," Proceedings of the Second International Workshop on Data Management on New Hardware, Jun. 25, 2006.
Lo et al., "Converting Thread-Level Parallelism to Instruction-Level Parallelism via Simultaneous Multithreading,"ACM Transactions on Computer Systems, vol. 15, No. 3, Aug. 1997.
Barabash, K. et al, "A Parallel, Incremental, Mostly Concurrent Garbage Collector for Servers,"ACM Transactions on Programming Languages and Systems, vol. 27, No. 6, Nov. 2005.

* cited by examiner

Primary Examiner — Jennifer To
Assistant Examiner — Abu Z Ghaffari
(74) Attorney, Agent, or Firm — VanLeeuwen & VanLeeuwen; Diana R. Gerhardt

(57) ABSTRACT

A utilization analyzer acquires accumulator values from multiple accumulators. Each accumulator corresponds to a particular processor thread and also corresponds to a particular processor utilization resource register (PURR). The utilization analyzer identifies, from the multiple accumulators, a combination of equal accumulators that each includes a largest accumulator value. Next, the utilization analyzer selects a subset of processor utilization resource registers from a combination of processor utilization resource registers that correspond to the combination of equal accumulators. The subset of processor utilization resource registers omits at least one processor utilization resource register from the combination of utilization resource registers. In turn, the utilization analyzer increments each of the subset of utilization resource registers.

17 Claims, 8 Drawing Sheets

400

| Equal Accumulator Combinations | | | | |
|---|---|---|---|---|
| Accumulator 0 | x | x | x | |
| Accumulator 1 | x | x | | x |
| Accumulator 2 | x | | x | x |
| Accumulator 3 | | x | x | x |
| PURR Incrementation | | | | |
| PURR 0 | 1/2 | | 1/2 | |
| PURR 1 | | 1/2 | | 1/2 |
| PURR 2 | 1/2 | | 1/2 | |
| PURR 3 | | 1/2 | | 1/2 |

510 — accum_t01_lt_t23 <= (not accum_t0_lt_t1 and   (accum_t0_lt_t2 or  accum_t0_lt_t3)) or
                        (    accum_t0_lt_t1 and   (accum_t1_lt_t2 or  accum_t1_lt_t3));

520 — accum_t01_eq_t23 <= (not accum_t0_lt_t1 and not accum_t2_lt_t3 and accum_t0_eq_t2) or
                          (    accum_t0_lt_t1 and not accum_t2_lt_t3 and accum_t1_eq_t2) or
                          (not accum_t0_lt_t1 and     accum_t2_lt_t3 and accum_t0_eq_t3) or
                          (    accum_t0_lt_t1 and     accum_t2_lt_t3 and accum_t1_eq_t3);

530 — accum_t01_gt_t23 <= (not accum_t0_lt_t1 and   accum_t0_gt_t2 and accum_t0_gt_t3) or
                          (    accum_t0_lt_t1 and   accum_t1_gt_t2 and accum_t1_gt_t3);

-- Determine amount to increment each PURR

540 — pur_add1(0) <= (accum_t0_eq_t1 and accum_t2_eq_t3 and accum_t01_eq_t23);
      pur_add1(1) <= (accum_t0_eq_t1 and accum_t2_eq_t3 and accum_t01_eq_t23);
      pur_add1(2) <= (accum_t0_eq_t1 and accum_t2_eq_t3 and accum_t01_eq_t23);
      pur_add1(3) <= (accum_t0_eq_t1 and accum_t2_eq_t3 and accum_t01_eq_t23);

550 — pur_add2(0) <= (accum_t0_eq_t1 and  accum_t01_gt_t23) or
                     (accum_t0_gt_t1 and  accum_t01_eq_t23) or   -- 1011
                     (accum_t0_eq_t1 and accum_t2_gt_t3 and accum_t01_eq_t23);   -- 1110 pur_add2(1) <= (accum_t0_eq_t1 and  accum_t01_gt_t23) or
                     (accum_t0_lt_t1 and  accum_t01_eq_t23) or   -- 0111
                     (accum_t0_eq_t1 and accum_t2_lt_t3 and accum_t01_eq_t23);   -- 1101 pur_add2(2) <= ( accum_t2_eq_t3 and accum_t01_lt_t23) or
                     ( accum_t2_gt_t3 and accum_t01_eq_t23) or   -- 1110
                     (accum_t0_gt_t1 and accum_t2_eq_t3 and accum_t01_eq_t23);   -- 1011 pur_add2(3) <= (accum_t2_eq_t3 and accum_t01_lt_t23) or
                     (accum_t2_lt_t3 and accum_t01_eq_t23) or   -- 1101
                     (accum_t0_lt_t1 and accum_t2_eq_t3 and accum_t01_eq_t23);   -- 0111

560 — pur_add4(0) <= accum_t0_gt_t1 and accum_t01_gt_t23;
      pur_add4(1) <= accum_t0_lt_t1 and accum_t01_gt_t23;
      pur_add4(2) <= accum_t2_gt_t3 and accum_t01_lt_t23;
      pur_add4(3) <= accum_t2_lt_t3 and accum_t01_lt_t23;

SYSTEM AND METHOD TO DISTRIBUTE ACCUMULATED PROCESSOR UTILIZATION CHARGES AMONG MULTIPLE THREADS

GOVERNMENT RIGHTS

This invention was made with United States Government support under Agreement No. HR0011-07-9-002 awarded by DARPA. The Government has certain rights in the invention.

BACKGROUND OF THE INVENTION

1. Technical Field

The present invention relates to distributing accumulated processor utilization charges among multiple threads. More particularly, the present invention relates to identifying a particular combination of equal accumulators and selecting a corresponding subset of processor utilization resource registers in which to allocate utilization charges.

2. Description of the Related Art

Many computer systems incorporate multi-threaded processing in order to support concurrent resource requests. For example, multiple customers may utilize a database management system and, in this example, a computer system may invoke a separate thread for each customer in order for each customer to access a database. During multi-threaded processing, a requirement may exist for a computer system to track resource utilization between threads (e.g., customers) in order to distribute resource utilization charges accordingly.

SUMMARY

A utilization analyzer acquires accumulator values from multiple accumulators. Each accumulator corresponds to a particular processor thread and also corresponds to a particular processor utilization resource register (PURR). The utilization analyzer identifies, from the multiple accumulators, a combination of equal accumulators that each includes a largest accumulator value. Next, the utilization analyzer selects a subset of processor utilization resource registers from a combination of processor utilization resource registers that correspond to the combination of equal accumulators. The subset of processor utilization resource registers omits at least one processor utilization resource register from the combination of utilization resource registers. In turn, the utilization analyzer increments each of the subset of utilization resource registers.

The foregoing is a summary and thus contains, by necessity, simplifications, generalizations, and omissions of detail; consequently, those skilled in the art will appreciate that the summary is illustrative only and is not intended to be in any way limiting. Other aspects, inventive features, and advantages of the present invention, as defined solely by the claims, will become apparent in the non-limiting detailed description set forth below.

BRIEF DESCRIPTION OF THE DRAWINGS

The present invention may be better understood, and its numerous objects, features, and advantages made apparent to those skilled in the art by referencing the accompanying drawings, wherein:

FIG. 4 is an exemplary table showing a list of different combinations of equal accumulators and different subsets of PURRs that a utilization analyzer selects based upon a particular combination of equal accumulators;

FIG. 5 includes exemplary hardware description language (HDL) that a utilization analyzer implements for comparing accumulator values;

DETAILED DESCRIPTION

Certain specific details are set forth in the following description and figures to provide a thorough understanding of various embodiments of the invention. Certain well-known details often associated with computing and software technology are not set forth in the following disclosure, however, to avoid unnecessarily obscuring the various embodiments of the invention. Further, those of ordinary skill in the relevant art will understand that they can practice other embodiments of the invention without one or more of the details described below. Finally, while various methods are described with reference to steps and sequences in the following disclosure, the description as such is for providing a clear implementation of embodiments of the invention, and the steps and sequences of steps should not be taken as required to practice this invention. Instead, the following is intended to provide a detailed description of an example of the invention and should not be taken to be limiting of the invention itself. Rather, any number of variations may fall within the scope of the invention, which is defined by the claims that follow the description.

The following detailed description will generally follow the summary of the invention, as set forth above, further explaining and expanding the definitions of the various aspects and embodiments of the invention as necessary. To this end, this detailed description first sets forth a computing environment in FIG. 1 that is suitable to implement the software and/or hardware techniques associated with the invention.

Figure 1:
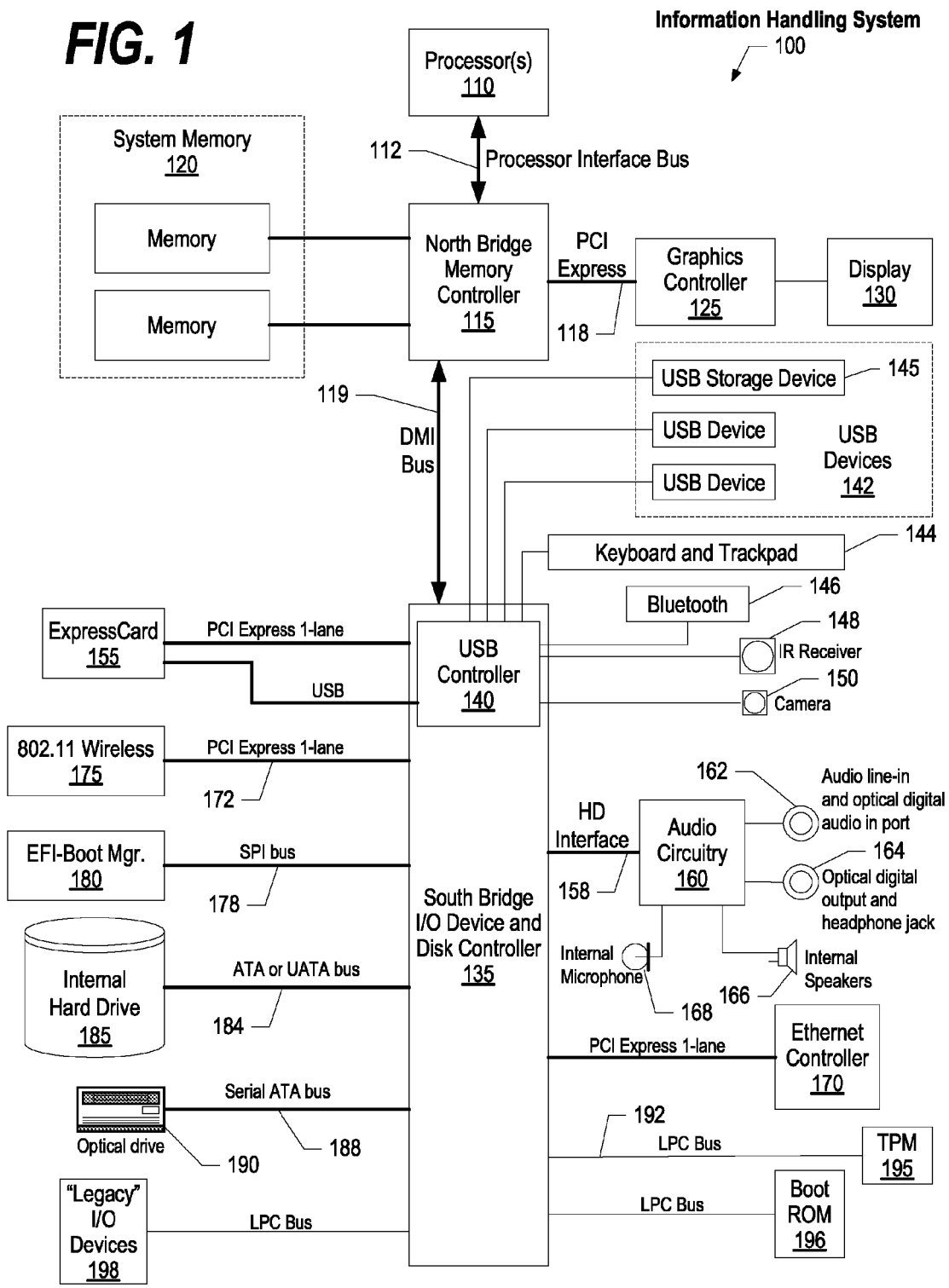
FIG. 1 is an exemplary block diagram of a data processing system in which the methods described herein can be implemented.

FIG. 1 illustrates information handling system 100, which is a simplified example of a computer system capable of performing the computing operations described herein. Information handling system 100 includes one or more processors 110 coupled to processor interface bus 112. Processor interface bus 112 connects processors 110 to Northbridge 115, which is also known as the Memory Controller Hub (MCH). Northbridge 115 connects to system memory 120 and provides a means for processor(s) 110 to access the system memory. Graphics controller 125 also connects to Northbridge 115. In one embodiment, PCI Express bus 118 connects Northbridge 115 to graphics controller 125. Graphics controller 125 connects to display device 130, such as a computer monitor.

Northbridge 115 and Southbridge 135 connect to each other using bus 119. In one embodiment, the bus is a Direct Media Interface (DMI) bus that transfers data at high speeds in each direction between Northbridge 115 and Southbridge 135. In another embodiment, a Peripheral Component Interconnect (PCI) bus connects the Northbridge and the Southbridge. Southbridge 135, also known as the I/O Controller Hub (ICH) is a chip that generally implements capabilities that operate at slower speeds than the capabilities provided by the Northbridge. Southbridge 135 typically provides various busses used to connect various components. These busses include, for example, PCI and PCI Express busses, an ISA bus, a System Management Bus (SMBus or SMB), and/or a Low Pin Count (LPC) bus. The LPC bus often connects low-bandwidth devices, such as boot ROM 196 and "legacy" I/O devices (using a "super I/O" chip). The "legacy" I/O devices (198) can include, for example, serial and parallel ports, keyboard, mouse, and/or a floppy disk controller. The LPC bus also connects Southbridge 135 to Trusted Platform Module (TPM) 195. Other components often included in Southbridge 135 include a Direct Memory Access (DMA) controller, a Programmable Interrupt Controller (PIC), and a storage device controller, which connects Southbridge 135 to nonvolatile storage device 185, such as a hard disk drive, using bus 184.

ExpressCard 155 is a slot that connects hot-pluggable devices to the information handling system. ExpressCard 155 supports both PCI Express and USB connectivity as it connects to Southbridge 135 using both the Universal Serial Bus (USB) the PCI Express bus. Southbridge 135 includes USB Controller 140 that provides USB connectivity to devices that connect to the USB. These devices include webcam (camera) 150, infrared (IR) receiver 148, keyboard and trackpad 144, and Bluetooth device 146, which provides for wireless personal area networks (PANs). USB Controller 140 also provides USB connectivity to other miscellaneous USB connected devices 142, such as a mouse, removable nonvolatile storage device 145, modems, network cards, ISDN connectors, fax, printers, USB hubs, and many other types of USB connected devices. While removable nonvolatile storage device 145 is shown as a USB-connected device, removable nonvolatile storage device 145 could be connected using a different interface, such as a Firewire interface, etcetera.

Wireless Local Area Network (LAN) device 175 connects to Southbridge 135 via the PCI or PCI Express bus 172. LAN device 175 typically implements one of the IEEE 802.11 standards of over-the-air modulation techniques that all use the same protocol to wireless communicate between information handling system 100 and another computer system or device. Optical storage device 190 connects to Southbridge 135 using Serial ATA (SATA) bus 188. Serial ATA adapters and devices communicate over a high-speed serial link. The Serial ATA bus also connects Southbridge 135 to other forms of storage devices, such as hard disk drives. Audio circuitry 160, such as a sound card, connects to Southbridge 135 via bus 158. Audio circuitry 160 also provides functionality such as audio line-in and optical digital audio in port 162, optical digital output and headphone jack 164, internal speakers 166, and internal microphone 168. Ethernet controller 170 connects to Southbridge 135 using a bus, such as the PCI or PCI Express bus. Ethernet controller 170 connects information handling system 100 to a computer network, such as a Local Area Network (LAN), the Internet, and other public and private computer networks.

While FIG. 1 shows one information handling system, an information handling system may take many forms. For example, an information handling system may take the form of a desktop, server, portable, laptop, notebook, or other form factor computer or data processing system. In addition, an information handling system may take other form factors such as a personal digital assistant (PDA), a gaming device, ATM machine, a portable telephone device, a communication device or other devices that include a processor and memory.

The Trusted Platform Module (TPM 195) shown in FIG. 1 and described herein to provide security functions is but one example of a hardware security module (HSM). Therefore, the TPM described and claimed herein includes any type of HSM including, but not limited to, hardware security devices that conform to the Trusted Computing Groups (TCG) standard, and entitled "Trusted Platform Module (TPM) Specification Version 1.2." The TPM is a hardware security subsystem that may be incorporated into any number of information handling systems.

Figure 2:
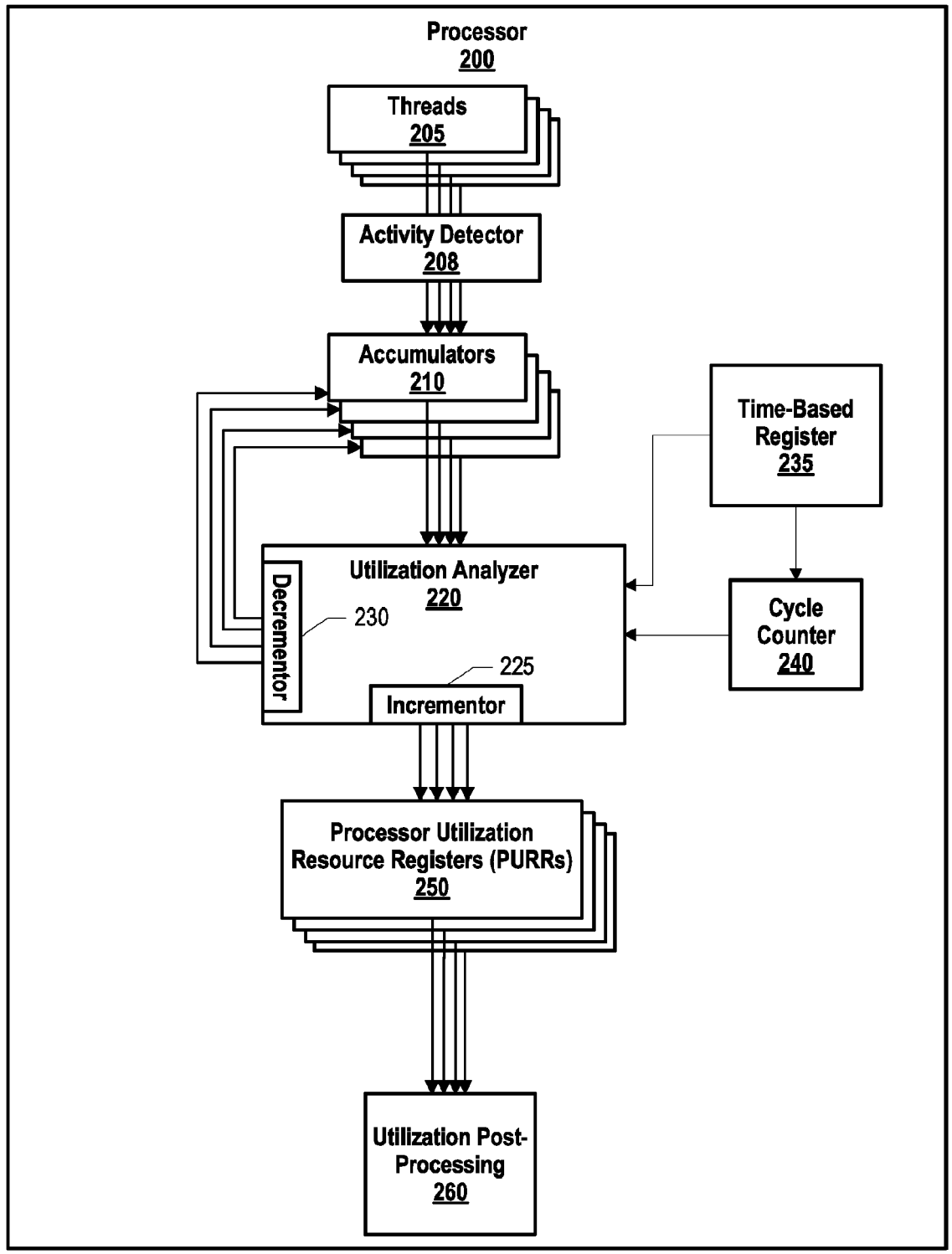
FIG. 2 is an exemplary diagram showing a utilization analyzer allocating utilization resource charges based upon thread activity.

FIG. 2 is a diagram showing a utilization analyzer allocating utilization resource charges based upon thread activity. Processor 200 invokes processor threads 205 for different program instances, such as invoking a processor thread for each customer that accesses a database. For each processor thread 205, processor 200 allocates one of accumulators 210 and one of processor utilization resource registers (PURRs) 250. Each accumulator 210 tracks processor thread activity and each PURR tracks resource utilization, such as tracking an amount of resources a particular customer utilizes over a time period.

During each clock cycle, activity detector 208 monitors processor threads 205 and identifies active threads. In turn, activity detector 208 increments the active threads' corresponding accumulators 210 by a particular amount. The total accumulator increment value that activity detector 208 partitions across all active threads' accumulators for a given clock cycle may be a fixed value, such as "1" or "100." As such, when activity detector 208 identifies one active thread, activity detector 208 increments the active thread's corresponding accumulator 210 by the total accumulator increment value, or "100." However, when activity detector 208 identifies two active threads, activity detector 208 increments each corresponding accumulator 210 by half of the total accumulator increment value, or "50" each.

At particular intervals, time-based (TB) register 235 provides an interval signal to utilization register 220. For example, TB register 235 may provide the interval signal to utilization register 220 every second. Cycle counter 240 tracks the number of clock cycles between intervals for later use (see below). When utilization analyzer 220 receives the interval signal from TB register 235, utilization analyzer 220 checks accumulators 210's values and identifies one or more accumulators that include the largest accumulator value. For example, four accumulators may include corresponding accumulator values of 110, 135, 135, and 135. In this example, three out of four accumulators have the largest accumulator value of 135, which results in three "equal accumulators."

Next, utilization analyzer 220 determines whether the quantity of equal accumulators equals a power of two computation, such as $2^0=1$, $2^1=2$, $2^2=4$, $2^3=8$, etcetera. If the quantity of equal accumulators equals a power of two computation, utilization analyzer 220 utilizes binary math to partially increment each PURR that corresponds to each active thread as well as partially decrement each accumulators 210 that correspond to each active thread. The partial increment and partial decrement are based upon the number of equal threads. For example, for two equal threads, utilization analyzer 220 increments each corresponding PURR by ½ of the total PURR increment amount. For four equal threads, utilization analyzer 220 increments each corresponding PURR by ¼ of the total PURR increment amount.

On the other hand, if the quantity of equal accumulators does not equal a power of two computation, utilization analyzer 220 is not able to utilize binary math. For example, for three equal threads, utilization analyzer 220 is not able to increment each corresponding PURR ⅓ of the total PURR increment amount without having a remainder or incrementing one PURR more than the other (e.g., 0.33, 0.33, 0.34).

Instead, utilization analyzer 220 identifies a corresponding subset of PURRs based upon the combination of equal accumulators. For example, the combination of equal accumulators may include accumulator 0, 1, and 2 and the subset of PURRs may only include PURR 0 and 2, thus omitting PURR 1. Utilization analyzer 220 selects the subset of PURRs based upon different equal accumulator combinations, and provides each PURR an equal probability of being included in a subset of PURRs (see FIGS. 4, 5, and corresponding text for further details). In one embodiment, utilization analyzer 220 utilizes comparator and logic hardware to determine which PURR's to increment. In another embodiment, utilization analyzer 220 utilizes software and a lookup table (not shown) to determine which PURRs to increment.

Once utilization analyzer 220 identifies the subset of PURRs, utilization analyzer 220 utilizes incrementor 225 to increment the corresponding PURRs included in PURRs 250 accordingly. Continuing with the example above and assuming the total PURR increment value is 100, incrementor 225 increments PURR 0 by 50 and increments PURR 2 by 50 because the subset of PURRs includes PURRs 0 and 2.

In addition, utilization analyzer 220 utilizes decrementor 230 to decrement corresponding accumulators included in accumulators 210 that correspond to the subset of PURRs. Decrementor 230 retrieves a cycle count from cycle counter 240 that identifies the number of clock cycles between intervals, and uses the cycle count as a "total accumulator decrement value." Continuing with the example above and assuming the total accumulator decrement value is 100, decrementor 230 decrements accumulator 0 by 50 and decrements accumulator 2 by 50.

At regular occurrences, such as on a daily basis, utilization post-processing 260 retrieves PURRs 250's values and allocates resource utilization charges to customers accordingly. For example, four PURRs may include values of 125, 125, 250, and 500 and, in this example, utilization post-processing 260 charges the first two corresponding customers 12.5% of a total resource utilization charge; charges the third customer 25% of the total resource utilization charge; and charges the fourth customer 50% of the total resource utilization charge. As one skilled in the art can appreciate, utilization post-processing 260 may reside within processor 200 or may reside external to processor 200 on a separate processor.

Figure 3:
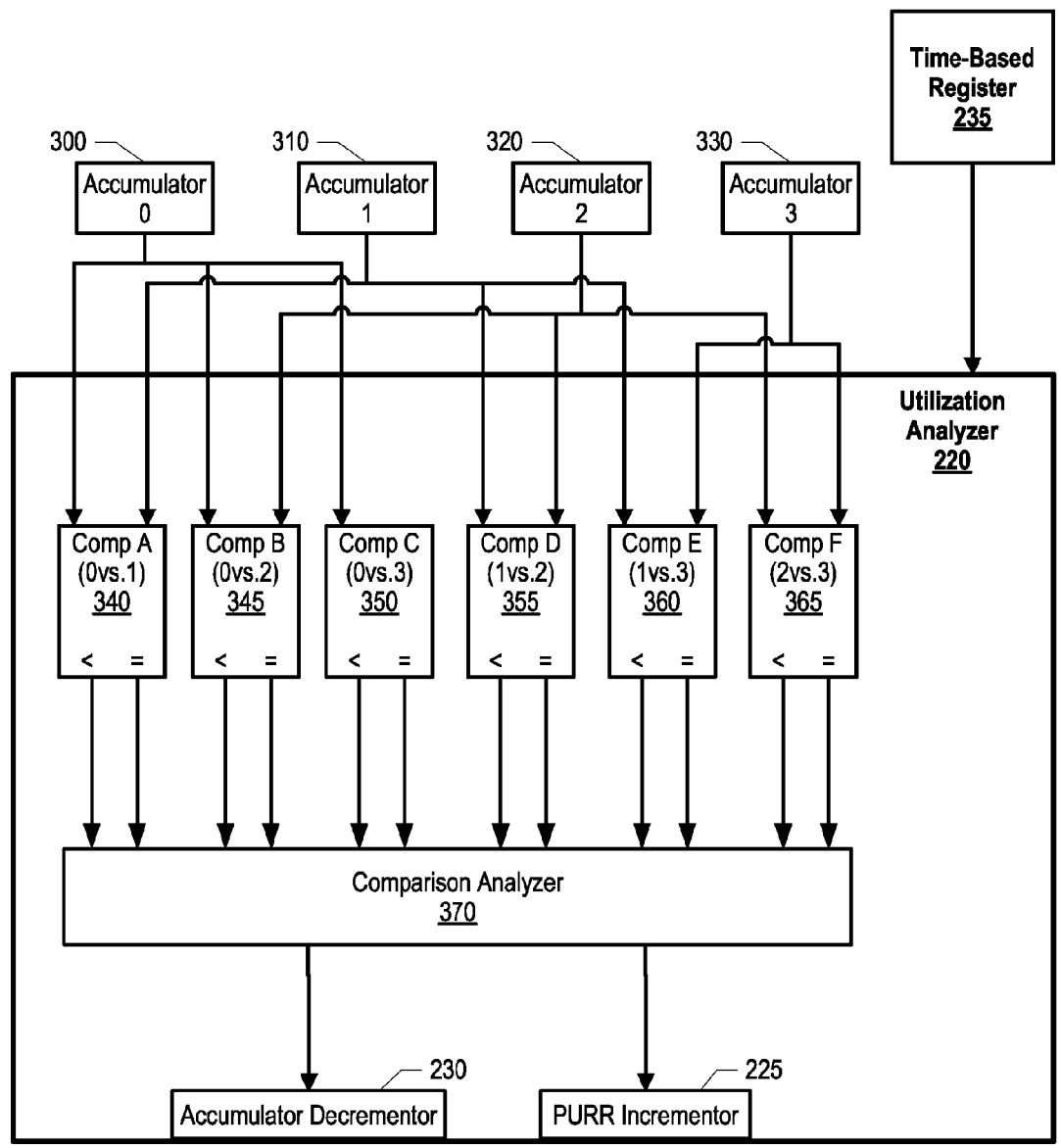
FIG. 3 is an exemplary diagram showing a utilization analyzer comparing accumulator values in order to determine an amount to increment and decrement particular PURRs and accumulators, respectively.

FIG. 3 is a diagram showing a utilization analyzer comparing accumulator values in order to determine an amount to increment/decrement particular PURRs/accumulators. Time-based register 235 sends an interval signal to utilization analyzer 220, which instructs utilization analyzer 220 to compare accumulator values included in accumulators 300-330.

In order to compare all of the accumulator values and determine which PURRs to increment within one clock cycle, utilization analyzer 220 includes comparators 340-365 and comparison analyzer 370. Comparators 340-365 compare different accumulator values and comparison analyzer 370 analyzes the comparison results. Comparator A 340 compares accumulator 0 300's value against accumulator 1 310's value. When the two values are equal, comparator A 340's "=" signal is true. When accumulator 0 300's value is less than accumulator 1 310's value, comparator A 340's "<" signal is true. And, when accumulator 0 300's value is greater than accumulator 1 310's value, neither comparator A 340's "=" nor "<" signal is true.

Likewise, comparator B 345 compares accumulator 0 300's value against accumulator 2 320's value. Comparator C 350 compares accumulator 0 300's value against accumulator 3 330's value. Comparator D 355 compares accumulator 1 310's value against accumulator 2 320's value. Comparator E 360 compares accumulator 1 310's value against accumulator 3 330's value. And, comparator F 365 compares accumulator 2 320's value against accumulator 3 330's value.

Comparison analyzer 370 receives comparators 340-365's results and determines which PURRs to increment. Comparison analyzer 370 may include hardware logic based upon hardware description language (HDL) 500 shown in FIG. 5. In another embodiment, comparison analyzer 370 may utilize software code and a look-up table (not shown) to determine which PURRs to increment and by what amount.

Once determined, comparison analyzer 370 sends signals to PURR incrementor 225 to increment particular PURRs (see FIGS. 4, 5, and corresponding text for further details). In addition, comparison analyzer 370 sends signals to accumulator decrementor 230 to decrement corresponding accumulators.

FIG. 4 is a table showing a list of different combinations of equal accumulators and different subsets of PURRs that a utilization analyzer selects based upon a particular combination of equal accumulators. Table 400 includes columns 450-480, which identify four different combinations of equal accumulators for four accumulators shown in rows 405-420. Referring to rows 405-420, column 450 denotes that accumulators 0, 1, and 2 are equal. Column 460 denotes that accumulators 0, 1, and 3 are equal. Column 470 denotes that accumulators 0, 2, and 3 are equal. And, column 480 denotes that accumulators 1, 2, and 3 are equal.

Rows 425-440 show a subset of PURRs that the utilization analyzer selects for a particular combination of equal accumulators. Column 450 shows that the utilization analyzer selects PURRs 0 and 2 when accumulators 0, 1, and 2 are equal. Column 460 shows that the utilization analyzer selects PURRs 1 and when accumulators 0, 1, and 3 are equal. Column 470 shows that the utilization analyzer selects PURRs 0 and 2 when accumulators 0, 2, and 3 are equal. And, column 480 shows that the utilization analyzer selects PURRs 1 and 3 when accumulators 1, 2, and 3 are equal. As can be seen, table 400 shows that the utilization analyzer includes each PURR in the subset of PURRs two times and, since each subset includes two PURRs, the utilization analyzer increments each PURR by ½ of a total PURR increment amount.

For simplicity, table 400 includes a select combination of equal accumulator scenarios, which does not include scenarios when the number of equal accumulators equals a power of two computation. As one skilled in the art can appreciate, if one accumulator includes the largest value, the utilization analyzer increments its corresponding PURR by the total PURR increment amount. Likewise, if all four accumulators include the largest value, the utilization manager increments all four corresponding PURRs by ¼ the total PURR increment amount.

FIG. 5 includes exemplary hardware description language (HDL) that a utilization analyzer implements for comparing accumulator values. Referring to FIG. 3, utilization analyzer 220's comparison analyzer 370 includes logic gates that correspond to HDL 500, which analyzes comparators 340-365's results. HDL 500 identifies accumulators 300-330 shown in FIG. 3 as "t0," "t1," "t2," and "t3," respectively.

HDL 500 includes three "first stage" lines of code (lines 510-530) that identify whether the larger of two comparators is less than the larger of two different comparators. For example, line 510 shows that "accum_t01_lt_t23" is true when one of the conditions to the right of the arrow is true. Meaning, the larger of accumulators 0 and 1 is less than the larger of accumulators 2 and 3 when one of the conditions to the right of the arrow is true. For example, when a0=20, a1=15, a2=22, a3=30, the result of a0,1=20 (a0 value because a0 is larger than a1) and the result of a2,3=30 (a3 value because a3 is larger than a2). Therefore a0,1<a2,3 because 20<30.

Line 520 shows that "accum_t01_eq_t23" is true when one of the conditions to the right of the arrow is true. Meaning, the larger of accumulators 0 and 1 equals the larger of accumulators 2 and 3 when one of the conditions to the right of the arrow is true. And, line 530 shows that "accum_t01_gt_t23" is true when one of the conditions to the right of the arrow is true. Meaning, the larger of accumulators 0 and 1 is greater than the larger of accumulators 2 and 3 when one of the conditions to the right of the arrow is true.

Comparison analyzer 370 uses the first stage results during a second stage analysis (lines 540-560) that determines which PURRs to increment and an increment amount. For each signal on the left side of the arrows, the number in parentheses indicates which PURR to increment and the number before the parentheses indicates the amount in which to increment the PURR. In the example shown in FIG. 5, the actual increment amount is the amount shown divided by four. Meaning, pur_addX(Y) indicates that a utilization analyzer increments the PURR for thread "Y" by X/4.

Assuming the total PORR increment amount is "1," line 540 includes conditions when all four accumulators are equal and, therefore, comparison analyzer increments each PURR by ¼. For example, pur_add1(0) is a signal for incrementing PURR 0 by ¼. Comparison analyzer 370 activates this signal when th0=th1 (Comp A 340 result) AND t2=t3 (Comp F 365 result) AND th0,th1=th2,th3 (line 520 result from above).

Line 550 includes conditions when two accumulators are equal or when three accumulators are equal but only two PURRs are chosen for a subset of processor utilization resource registers. For example, pur_add2(3) is a signal for incrementing PURR 3 by ⅔ (or ½). Comparison analyzer 370 activates this signal when any of the following are true:
- th2=th3 (Comp F 365 result) AND th0,th1<th2,th3 (line 510 result from above). (True when accumulators 2 and 3 have the largest value).
- th2≦th3 (Comp F 365 result) AND th0,th1=th2,th3 (line 520 result from above). (True when th0,1,3 or th0,3 or th1,3 have largest value. Comparison analyzer 370 increments accumulator 3 regardless of the scenario).
- th0<th1 (Comp A 340 result) AND th2=th3 (Comp F 365 result) AND th0,th1=th2,th3 (line 520 result from above). (True when th1,2,3 have the largest value. Comparison analyzer 370 increments accumulators 1 and 3 in this scenario).

Line 560 includes conditions when only one accumulator has the largest value and, therefore, comparison analyzer 370 increments only one PURR by 4/4 (1). For example, pur_add4(0) indicates to increment PURR 0 by 4/4. Comparison analyzer 370 activates this signal when the condition "th0>th1 AND th0,1>th2,3" is true.

Figure 6A:
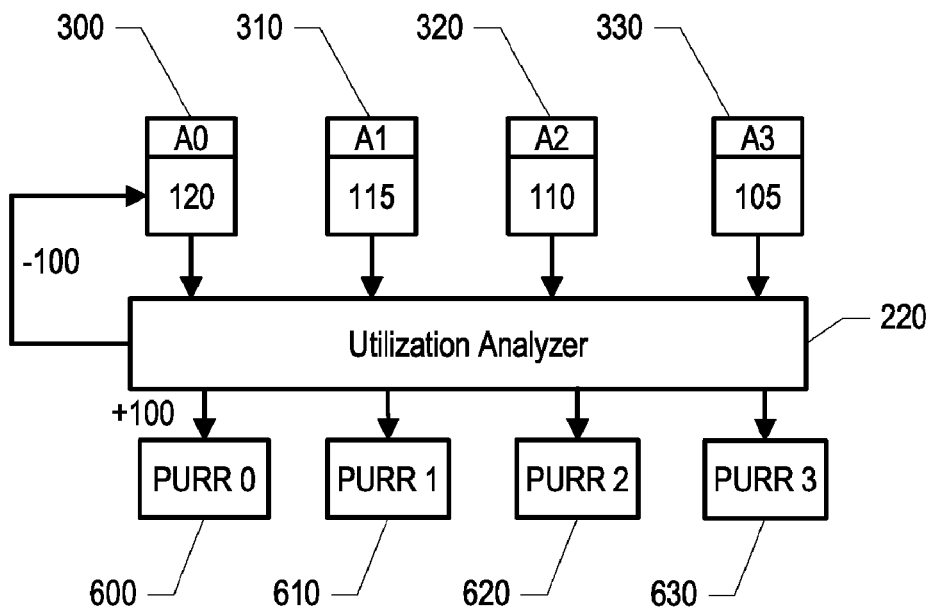
FIG. 6A is an exemplary diagram of a utilization analyzer identifying a single accumulator that includes a largest accumulator value and updating registers accordingly.

FIG. 6A is a diagram of a utilization analyzer identifying a single accumulator that includes a largest accumulator value and updating registers accordingly. Utilization analyzer 220 checks accumulators 300-330's values and determines that accumulator 300 includes the largest value of 120. In turn, utilization analyzer 220 increments PURR 0 600 by a total PURR increment value of 100 and decrements accumulator 300 by a total accumulator decrement amount of 100, thus lowering accumulator 300 to 20. As can be seen, utilization analyzer 220 does not increment PURRs 610-630 due to the fact that accumulators 310-330 do not include a largest accumulator value.

Figure 6B:
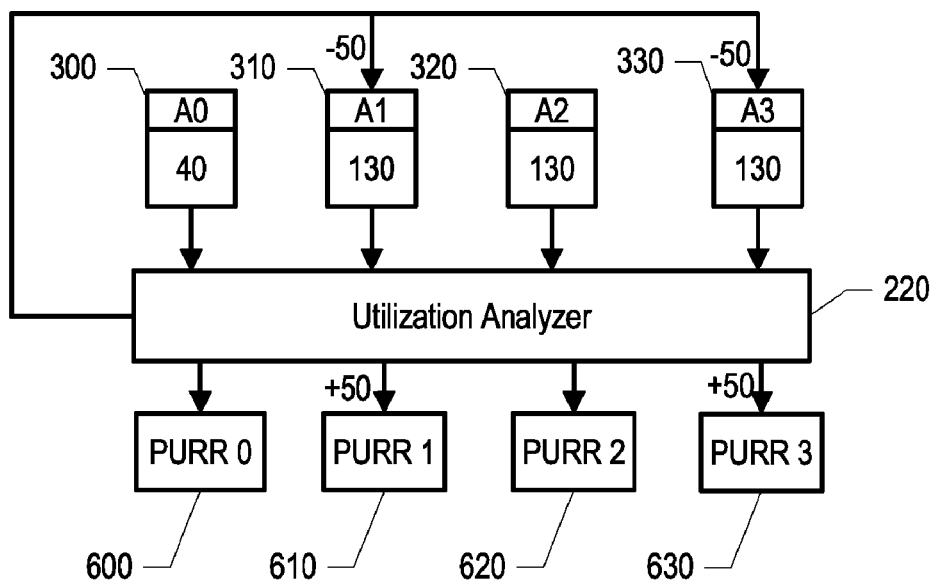
FIG. 6B is an exemplary diagram of a utilization analyzer determining that three accumulators include a largest accumulator value and incrementing a subset of PURRs.

FIG. 6B is a diagram of a utilization analyzer determining that three accumulators include a largest accumulator value and incrementing a subset of PURRs accordingly. Utilization analyzer 220 checks accumulators 300-330's values and determines that accumulators 1, 2, and 3 (310-330) each have a largest accumulator value of 130. In turn, utilization analyzer 220 identifies a subset of PURRs to correspond with the particular equal accumulators 1, 2, 3 combination. The example in FIG. 6B shows that PURRs 1 610 and 3 630 are included in the subset of PURRs, thus omitting PURR 2 620. In turn, utilization analyzer 220 increments PURRs 1 610 and 2 630 each by ½ the total PURR increment value (50) and decrements corresponding accumulators 1 310 and 3 330 each by ½ the total accumulator decrement amount (50).

Figure 7:
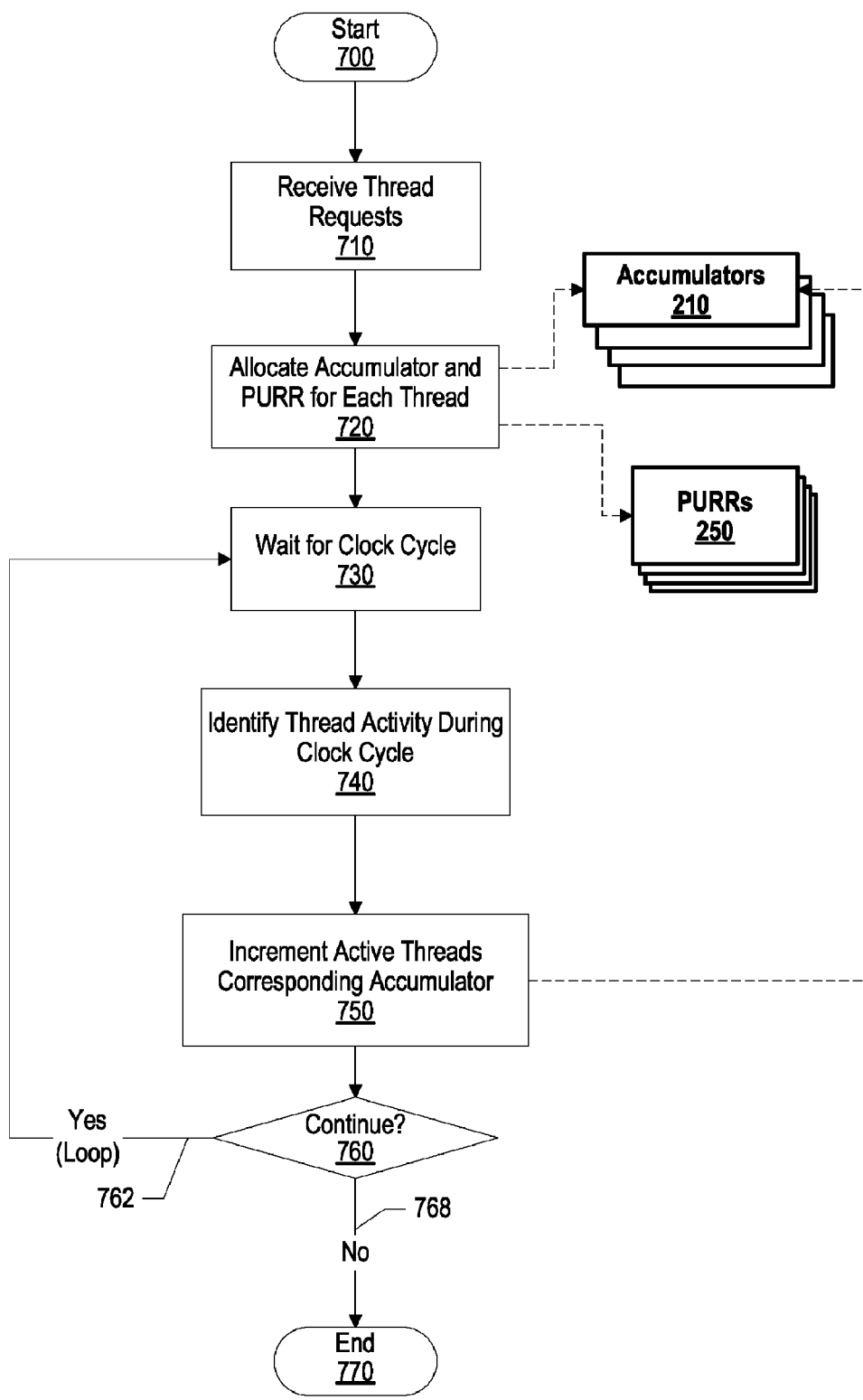
FIG. 7 is an exemplary flowchart showing steps taken in identifying active threads during clock cycles and incrementing the active threads' corresponding accumulators.

FIG. 7 is a flowchart showing steps taken in an activity detector identifying active threads during clock cycles and incrementing the active threads' corresponding accumulators. Processing commences at 700, whereupon a processor receives a number of thread requests a step 710. At step 720, the processor allocates an accumulator (accumulators 210) and a processor utilization resource register (PURRs 250) for each thread request.

An activity detector waits for a clock cycle at step 730. At step 740, the activity detector identifies thread activity during the clock cycle. For example, the activity detector may identify two active processor threads out of four processor threads. Next, the activity detector increments each active thread's corresponding accumulator 210. The total amount that the activity detector increments accumulators 210 for a given clock cycle equals a "total accumulator increment value." For example, if the activity detector identifies one active processor thread, the activity detector increments its corresponding accumulator 210 by the total accumulator increment value, such as "1" or "100." In another example, when the activity detector identifies two active processor threads, the activity detector increments their corresponding accumulators 210 by ½ of the total accumulator increment value, or "0.5."

The activity detector determines whether to continue monitoring thread activity and incrementing accumulators (decision 760). If the activity detector should continue, the activity detector branches to "Yes" branch 762, which loops back to identify thread activity and increment accumulators accordingly. This looping continues until the activity detector should stop monitoring thread activity, at which point the activity detector branches to "No" branch 768 whereupon processing ends at 770.

Figure 8:
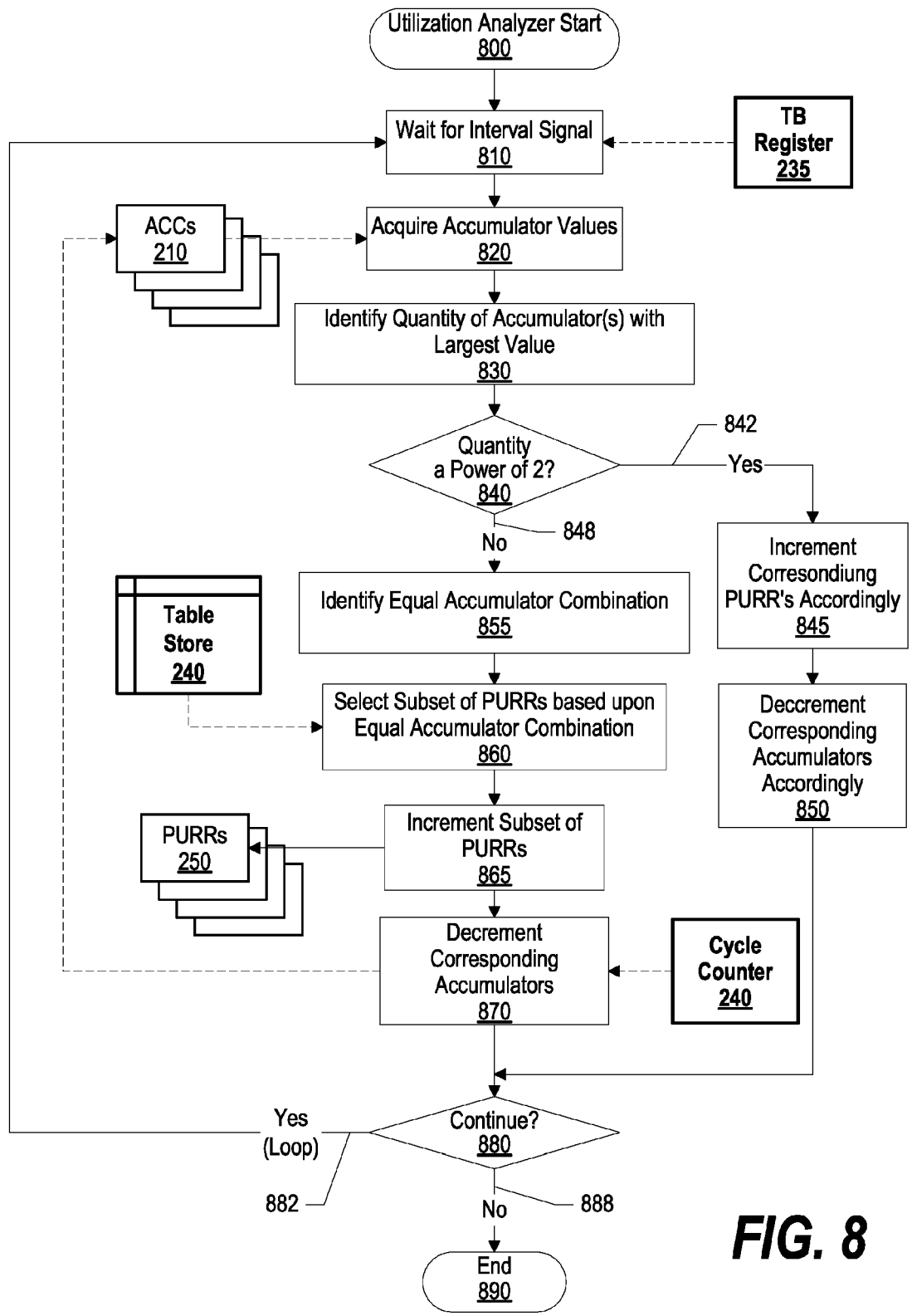
FIG. 8 is an exemplary flowchart showing steps taken in analyzing accumulator values and incrementing processor utilization resource registers accordingly.

FIG. 8 is a flowchart showing steps taken in a utilization analyzer analyzing accumulator values and incrementing processor utilization resource registers accordingly. As discussed earlier, a utilization analyzer may incorporate these steps utilizing a software-based approach or a hardware-based approach. Processing commences at 800, whereupon the utilization analyzer waits for an interval signal from time-based (TB) register 235 at step 810. TB register 235 provides the interval signal at particular intervals, such as every second. The utilization analyzer acquires accumulators 210's values at step 820, and identifies a quantity of accumulators with the largest value that are equal (step 830). For example, four accumulators may include accumulator values of 110, 135, 135, and 135. In this example, three out of four have the largest value of 135, thus making them "equal accumulators."

The utilization manager determines whether the quantity of equal accumulators equals a power of two computation, such as $2^0=1, 2^1=2, 2^2=4, 2^3=8$, etcetera (decision 840). If the quantity of equal accumulators equals a power of two computation, the utilization analyzer branches to "Yes" branch 842 whereupon the utilization analyzer utilizes binary math to increment corresponding PURRs (step 845) and decrements corresponding accumulators (step 850). For example, if the quantity of equal accumulators is two, the utilization analyzer increments each corresponding PURR by ½ the total PURR increment value and decrements each corresponding accumulator by ½ the total accumulator decrement value.

On the other hand, if the quantity of equal accumulators does not equal a power of two computation, the utilization analyzer branches to "No" branch 848, whereupon the utilization analyzer identifies which accumulators are included in the combination of equal accumulators, such as accumulators 0, 2, 3 (step 855). Next, the utilization analyzer selects a subset of PURRs based upon the equal accumulator combination, such as PURRs 0 and 2 (see FIGS. 4, 5, and corresponding text for further details). In one embodiment, the utilization analyzer incorporates hardware logic to perform steps 830-860 in order to identify the largest accumulator values and select which PURRs to increment all within a single clock cycle.

At step 865, the utilization analyzer increments the subset of PURRs in PURRs 250. Using the example described above, the utilization analyzer increments PURRs 0 and 2 by an amount that is ½ the total PURR increment value. At step 870, the utilization analyzer retrieves a cycle count included cycle counter 240 and decrements a subset of accumulators included in accumulators 210 that correspond to the subset of PURRs accordingly. Continuing with the example described above, the utilization analyzer decrements accumulators 0 and 2 by an amount that is ½ the total accumulator decrement value.

The utilization analyzer determines whether to continue analyzing accumulator values and incrementing PURRs (decision 880). If the utilization analyzer should continue, the utilization analyzer branches to "Yes" branch 882, which loops back to continue to analyze accumulator values. This looping continues until the utilization analyzer should terminate, at which point the utilization analyzer branches to "No" branch 888 whereupon processing ends at 890.

One of the preferred implementations of the invention is a client application, namely, a set of instructions (program code) or other functional descriptive material in a code module that may, for example, be resident in the random access memory of the computer. Until required by the computer, the set of instructions may be stored in another computer memory, for example, in a hard disk drive, or in a removable memory such as an optical disk (for eventual use in a CD ROM) or floppy disk (for eventual use in a floppy disk drive). Thus, the present invention may be implemented as a computer program product for use in a computer. In addition, although the various methods described are conveniently implemented in a general purpose computer selectively activated or reconfigured by software, one of ordinary skill in the art would also recognize that such methods may be carried out in hardware, in firmware, or in more specialized apparatus constructed to perform the required method steps. Functional descriptive material is information that imparts functionality to a machine. Functional descriptive material includes, but is not limited to, computer programs, instructions, rules, facts, definitions of computable functions, objects, and data structures.

While particular embodiments of the present invention have been shown and described, it will be obvious to those skilled in the art that, based upon the teachings herein, that changes and modifications may be made without departing from this invention and its broader aspects. Therefore, the appended claims are to encompass within their scope all such changes and modifications as are within the true spirit and scope of this invention. Furthermore, it is to be understood that the invention is solely defined by the appended claims. It will be understood by those with skill in the art that if a specific number of an introduced claim element is intended, such intent will be explicitly recited in the claim, and in the absence of such recitation no such limitation is present. For non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to inventions containing only one such element, even when the same claim includes the introductory phrases "one or more" or "at least one" and indefinite articles such as "a" or "an"; the same holds true for the use in the claims of definite articles.

What is claimed is:

1. A machine-implemented method comprising:
    identifying, by a utilization analyzer, a plurality of processor threads, wherein each processor thread corresponds to an accumulator and a processor utilization resource register, resulting in a plurality of accumulators and a plurality of processor utilization resource registers;
    identifying, by the utilization analyzer, from the plurality of accumulators, a quantity of accumulators included in a first combination of equal accumulators that each include a largest accumulator value, the first combination of equal accumulators corresponding to a first combination of processor utilization resource registers from the plurality of processor utilization resource registers;
    in response to determining that the quantity of accumulators included in the first combination of equal accumulators does not equal a power of two:
        selecting, by the utilization analyzer, a first subset of processor utilization resource registers from the first combination of processor utilization resource registers, the first subset of processor utilization resource registers omitting at least one processor utilization resource register from the first combination of processor utilization resource registers, wherein the omission of at least one of the processor utilization resource registers results in a quantity of processor utilization resource registers included in the first subset of processor utilization resource registers equaling a power of two; and
        distributing, by the utilization analyzer, processor utilization charges between the first subset of processor utilization resource registers; and
    in response to determining that the quantity of accumulators included in the first combination of equal accumulators equals a power of two, distributing, by the utilization analyzer, the processor utilization charges between the first combination of processor utilization resource registers.

2. The method of claim 1 wherein the method performs the identification of the first combination of equal accumulators, the determination that the number of accumulators included in the first combination of equal accumulators does not equal a power of two, and the selection of the first subset of processor utilization resource registers within a single clock cycle.

3. The method of claim 1 wherein the distributing further comprises:
identifying, by the utilization analyzer, a total processor utilization resource register increment value; and
incrementing, by the utilization analyzer, each of the first subset of processor utilization resource registers by a value that equals the total processor utilization resource increment value divided by the quantity of processor utilization resource registers included in the first subset of processor utilization resource registers.

4. The method of claim 1 further comprising:
identifying, from the plurality of accumulators, a second combination of equal accumulators that includes at least one different accumulator than the first combination of equal accumulators, wherein the second combination of equal accumulators corresponds to a second combination of processor utilization resource registers, the second combination of processor utilization resource registers different than the first combination of processor utilization resource registers;
determining that a quantity of accumulators included in the second combination of equal accumulators does not equal a power of two;
in response to determining that the quantity of accumulators included in the second combination of equal accumulators does not equal a power of two, selecting a second subset of processor utilization resource registers from the second combination of processor utilization resource registers, the second subset of processor utilization resource registers omitting at least one processor utilization resource register from the second combination of processor utilization resource registers, and wherein the second subset of processor utilization resource registers is different than the first subset of processor utilization resource registers; and
incrementing each of the processor utilization resource registers included in the second subset of processor utilization resource registers.

5. The method of claim 1 wherein each of the plurality of processor utilization resource registers is included in the first subset of utilization registers an equal amount of times over a plurality of equal accumulator scenarios, wherein the quantity of accumulators corresponding to each of the plurality of equal accumulator scenarios does not equal a power of two, and wherein each of the plurality of equal accumulator scenarios includes a different combination of accumulators included in the plurality of accumulators.

6. The method of claim 1 further comprising:
decrementing, by the utilization analyzer, each of a subset of equal accumulators by a partial decrement amount, wherein the partial decrement amount equals a total decrement amount divided by a quantity of the subset of equal accumulators, the subset of equal accumulators corresponding to the first subset of utilization registers.

7. A processor comprising:
a plurality of processor utilization resource registers;
a plurality of accumulators;
a utilization analyzer with logic effective to:
identify, from the plurality of accumulators, a quantity of accumulators included in a first combination of equal accumulators that each include a largest accumulator value, the first combination of equal accumulators corresponding to a first combination of processor utilization resource registers from the plurality of processor utilization resource registers;
in response to determining that the quantity of accumulators included in the first combination of equal accumulators does not equal a power of two:
select a first subset of processor utilization resource registers from the first combination of processor utilization resource registers, the first subset of processor utilization resource registers omitting at least one processor utilization resource register from the first combination of processor utilization resource registers, wherein the omission of at least one of the processor utilization resource registers results in a quantity of processor utilization resource registers included in the first subset of processor utilization resource registers equaling a power of two; and
distribute processor utilization charges between the first subset of processor utilization resource registers; and
in response to determining that the quantity of accumulators included in the first combination of equal accumulators equals a power of two, distribute the processor utilization charges between the first combination of processor utilization resource registers.

8. The processor of claim 7 wherein the system performs the identification of the first combination of equal accumulators, the determination that the number of accumulators included in the first combination of equal accumulators does not equal a power of two, and the selection of the first subset of processor utilization resource registers within a single clock cycle.

9. The processor of claim 7 wherein the logic is further effective to:
identify a total processor utilization resource register increment value; and
increment each of the first subset of processor utilization resource registers by a value that equals the total processor utilization resource increment value divided by the quantity of processor utilization resource registers included in the first subset of processor utilization resource registers.

10. The processor of claim 7 wherein the logic is further effective to:
identify, from the plurality of accumulators, a second combination of equal accumulators that includes at least one different accumulator than the first combination of equal accumulators, wherein the second combination of equal accumulators corresponds to a second combination of processor utilization resource registers, the second combination of processor utilization resource registers different than the first combination of processor utilization resource registers;
determine that a quantity of accumulators included in the second combination of equal accumulators does not equal a power of two;
in response to determining that the quantity of accumulators included in the second combination of equal accumulators does not equal a power of two, select a second subset of processor utilization resource registers from the second combination of processor utilization resource registers, the second subset of processor utilization resource registers omitting at least one processor utilization resource register from the second combination of processor utilization resource registers, and wherein the second subset of processor utilization resource registers is different than the first subset of processor utilization resource registers; and increment each of the processor utilization resource registers included in the second subset of processor utilization resource registers.

11. The processor of claim 7 wherein each of the plurality of processor utilization resource registers is included in the first subset of utilization registers an equal amount of times over a plurality of equal accumulator scenarios, wherein the quantity of accumulators corresponding to each of the plurality of equal accumulator scenarios does not equal a power of two, and wherein each of the plurality of equal accumulator scenarios includes a different combination of accumulators included in the plurality of accumulators.

12. The processor of claim 7 wherein the logic is further effective to:

decrement each of a subset of equal accumulators by a partial decrement amount, wherein the partial decrement amount equals a total decrement amount divided by a quantity of the subset of equal accumulators, the subset of equal accumulators corresponding to the first subset of utilization registers.

13. An information handling system comprising:
one or more processors;
a memory coupled to at least one of the processors;
a nonvolatile storage area coupled to at least one of the processors;
a set of instructions stored in the memory and executed by at least one of the processors in order to perform actions of:

identifying a plurality of processor threads, wherein each processor thread corresponds to an accumulator and a processor utilization resource register, resulting in a plurality of accumulators and a plurality of processor utilization resource registers;

identifying, from the plurality of accumulators, a quantity of accumulators included in a first combination of equal accumulators that each include a largest accumulator value, the first combination of equal accumulators corresponding to a first combination of processor utilization resource registers from the plurality of processor utilization resource registers;

in response to determining that the quantity of accumulators included in the first combination of equal accumulators does not equal a power of two:

selecting a first subset of processor utilization resource registers from the first combination of processor utilization resource registers, the first subset of processor utilization resource registers omitting at least one processor utilization resource register from the first combination of processor utilization resource registers, wherein
the omission of at least one of the processor utilization resource registers results in a quantity of processor utilization resource registers included in the first subset of processor utilization resource registers equaling a power of two; and distributing processor utilization charges between the first subset of processor utilization resource registers; and in response to determining that the quantity of accumulators included in the first combination of equal accumulators equals a power of two, distributing the processor utilization charges between the first combination of processor utilization resource registers.

14. The information handling system of claim 13 wherein the set of instructions performs the identification of the first combination of equal accumulators, the determination that the number of accumulators included in the first combination of equal accumulators does not equal a power of two, and the selection of the first subset of processor utilization resource registers within a single clock cycle.

15. The information handling system of claim 13 wherein the set of instructions performs actions of:
identifying a total processor utilization resource register increment value; and
incrementing each of the first subset of processor utilization resource registers by a value that equals the total processor utilization resource increment value divided by the quantity of processor utilization resource registers included in the first subset of processor utilization resource registers.

16. The information handling system of claim 13 wherein the set of instructions performs actions of:
identifying, from the plurality of accumulators, a second combination of equal accumulators that includes at least one different accumulator than the first combination of equal accumulators, wherein the second combination of equal accumulators corresponds to a second combination of processor utilization resource registers, the second combination of processor utilization resource registers different than the first combination of processor utilization resource registers;
determining that a quantity of accumulators included in the second combination of equal accumulators does not equal a power of two;
in response to determining that the quantity of accumulators included in the second combination of equal accumulators does not equal a power of two, selecting a second subset of processor utilization resource registers from the second combination of processor utilization resource registers, the second subset of processor utilization resource registers omitting at least one processor utilization resource register from the second combination of processor utilization resource registers, and wherein the second subset of processor utilization resource registers is different than the first subset of processor utilization resource registers; and
incrementing each of the processor utilization resource registers included in the second subset of processor utilization resource registers.

17. The information handling system of claim 13 wherein each of the plurality of processor utilization resource registers is included in the first subset of utilization registers an equal amount of times over a plurality of equal accumulator scenarios, wherein the quantity of accumulators corresponding to each of the plurality of equal accumulator scenarios does not equal a power of two, and wherein each of the plurality of equal accumulator scenarios includes a different combination of accumulators included in the plurality of accumulators.

* * * * *